US009852273B2

(12) United States Patent
Arana et al.

(10) Patent No.: US 9,852,273 B2
(45) Date of Patent: Dec. 26, 2017

(54) METHODS AND SYSTEMS OF PLAYING MULTI-LICENSE MEDIA CONTENT

(71) Applicant: Disney Enterprises, Inc., Burbank, CA (US)

(72) Inventors: Mark Arana, Burbank, CA (US); Kevin Liao, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 641 days.

(21) Appl. No.: 14/207,352

(22) Filed: Mar. 12, 2014

(65) Prior Publication Data

US 2015/0261939 A1    Sep. 17, 2015

(51) Int. Cl.
G06F 21/10      (2013.01)
H04N 21/436     (2011.01)
H04N 21/462     (2011.01)
H04N 21/4627    (2011.01)

(52) U.S. Cl.
CPC .......... *G06F 21/10* (2013.01); *H04N 21/436* (2013.01); *H04N 21/4622* (2013.01); *H04N 21/4627* (2013.01); *G06F 2221/07* (2013.01)

(58) Field of Classification Search
CPC ... G06F 21/10; G06F 2221/07; H04N 21/436; H04N 21/4627
See application file for complete search history.

(56) References Cited

U.S. PATENT DOCUMENTS

| 7,346,687 | B2* | 3/2008 | Lipscomb ......... G06F 17/30035 707/999.01 |
| 2002/0138593 | A1 | 9/2002 | Novak et al. |
| 2005/0235143 | A1 | 10/2005 | Kelly |
| 2007/0083473 | A1* | 4/2007 | Farrugia ................. G06F 21/10 705/57 |
| 2012/0174150 | A1* | 7/2012 | Reddy .............. H04N 21/25841 725/31 |

(Continued)

OTHER PUBLICATIONS

European Patent Office, Extended European Search Report for EP 15158533.8, Jul. 20, 2015, pp. 1-7.

(Continued)

*Primary Examiner* — Brandon Hoffman
*Assistant Examiner* — Wasika Nipa
(74) *Attorney, Agent, or Firm* — Sheppard, Mullin, Richter & Hampton LLP

(57) ABSTRACT

Methods and systems described herein play multi-license media contents. A multi-license media content includes digital assets, at least one of which is encrypted and requires one or more licenses to be decrypted when being played. The digital assets may include a video digital asset, an audio digital asset, or a textual digital asset. The digital assets may be played by using licenses from multiple sources such that various components (e.g., a video component, an audio component, or a textual component) of a media content are synchronized. The media content may be played without downloading those licenses that already exist in the domain. Licenses may be retrieved adaptively when the licenses or the license segments required for playing the requested digital asset are incomplete. A related digital asset rather than the digital asset that is requested may be played thereby ensuring an uninterrupted media content delivery.

17 Claims, 5 Drawing Sheets

(56) References Cited

U.S. PATENT DOCUMENTS

2013/0169869 A1* 7/2013 Demoulin ............... H04N 5/04
                                                            348/515

OTHER PUBLICATIONS

Open Mobile Alliance Ltd., DRM Architecture OMA-AD-DRM-V2 2-20110419-C, Apr. 2011, pp. 1-34, Version 2.2., San Diego, California, USA.
International Electrotechnical Commission, IEC, IEC TC 100 Via SC 29 Secretariat: CD of IEC TS 62579, Apr. 14, 2009, pp. 1-30.
Hyon-Gon Choo et al., Study on ISO/IEC 29116 FCD Media Streaming MAF Protocol, Jun. 27, 2007, pp. 1-46.
The State Intellectual Property Office of P.R.C., Search Report for Chinese Application No. 2015101063619, dated Aug. 1, 2017, pp. 1-2.

* cited by examiner

METHODS AND SYSTEMS OF PLAYING MULTI-LICENSE MEDIA CONTENT

TECHNICAL FIELD

The present application relates generally to digital media, more particularly, some embodiments relate to methods and systems of playing multi-license media content.

DESCRIPTION OF THE RELATED ART

Digital distribution is the delivery of media content (e.g., audio, video, software, or video games) without the use of physical media. Digital distribution has become ubiquitous and bypassed conventional physical distribution methods (e.g., paper, CDs, or DVDs) due to the advances in computer networking and communication technologies. Nevertheless, delivery of media content is subject to many factors such as the network condition. For example, changes in network bandwidth, transmission delays or packet loss may decrease the distribution and/or delivery of the media content. Furthermore, playing of media content may be subject to licenses such as Digital Rights Management ("DRM") where the post-distribution use (e.g., viewing, copying, printing, or altering) of the media content may be restricted.

BRIEF SUMMARY OF THE APPLICATION

According to various embodiments of the application, methods and systems described herein play multi-license media contents. A multi-license media content includes digital assets, at least one of which is encrypted and requires one or more licenses to be decrypted when being played. The digital assets may include a video digital asset, an audio digital asset, or a textual digital asset. The digital assets may be played by using licenses from multiple sources such that various components (e.g., a video component, an audio component, or a textual component) of a media content are synchronized. In some embodiments, the media content may be played without downloading those licenses that already exist in the domain. Licenses may be retrieved adaptively such that a related digital asset rather than the digital asset that is requested may be played thereby ensuring an uninterrupted media content delivery.

In one embodiment, when a license or a license segment is retrieved from a source (e.g., a media content provider, or a device) into the domain, an index is created to associate the license or the license segment with the domain location where it resides. In various embodiments, an index such as a manifest file may be created to log the association of the license or the license segment with the domain location. The index may be distributed among all devices of the domain.

Other features and aspects of the application will become apparent from the following detailed description, taken in conjunction with the accompanying drawings, which illustrate, by way of example, the features in accordance with embodiments of the application. The summary is not intended to limit the scope of the application, which is defined solely by the claims attached hereto.

BRIEF DESCRIPTION OF THE DRAWINGS

The present application, in accordance with one or more various embodiments, is described in detail with reference to the following figures. The drawings are provided for purposes of illustration only and merely depict typical or example embodiments of the application. These drawings are provided to facilitate the reader's understanding of the application and shall not be considered limiting of the breadth, scope, or applicability of the application. It should be noted that for clarity and ease of illustration these drawings are not necessarily made to scale.

The figures are not intended to be exhaustive or to limit the application to the precise form disclosed. It should be understood that the application can be practiced with modification and alteration, and that the application be limited only by the claims and the equivalents thereof.

DETAILED DESCRIPTION OF THE EMBODIMENTS OF THE APPLICATION

Conventionally, when a user accesses the same media content using different devices, the full digital assets of a media content (e.g., the video, the audio, the alternate audio, the captions, etc.) need to be re-downloaded onto each device from a media content provider, as requested. One or more digital assets may be encrypted, and licenses are needed to decrypt and play these digital assets. Even in an optimized state, the user may still need to re-download one or more discrete digital assets of the media content in order to play the media content. The corresponding licenses need to be re-downloaded as well. The process consumes network bandwidth and may be time-consuming as one or more discrete digital assets need to be re-downloaded from one or more media content providers. As a result, the instantaneous playback of media content can be optimized.

Before describing the application in detail, it is useful to describe an example environment in which the application can be implemented. One such example is illustrated in FIG. 1.

Figure 1:
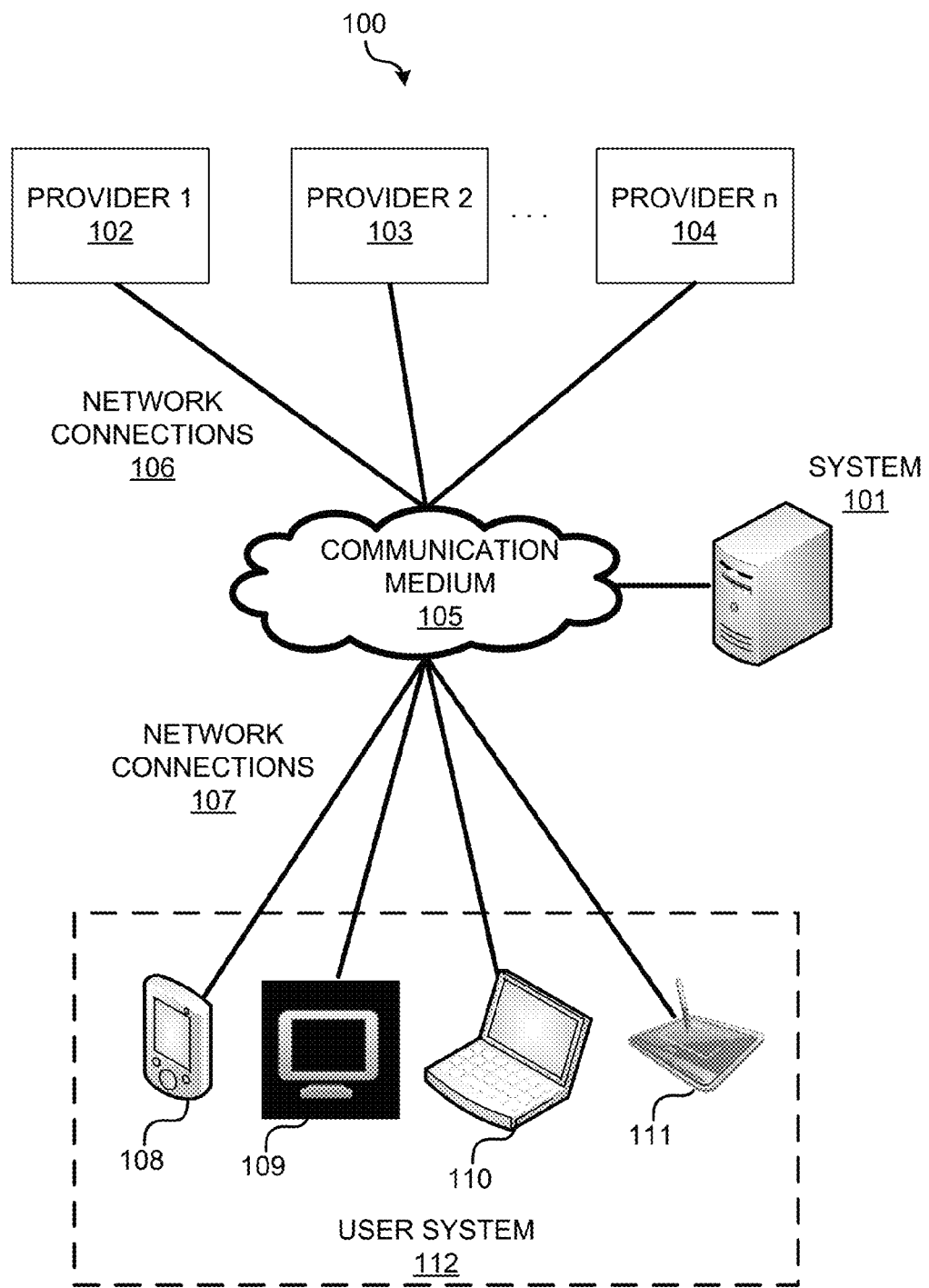
FIG. 1 illustrates an exemplary environment where various embodiments may be implemented.

FIG. 1 illustrates an exemplary environment 100 where various embodiments may be implemented. The environment 100 comprises various user devices 108-111, which may be collectively referred to as a user system 112 connected via a communication medium 105. A media content may comprise a set of digital assets such as a video content, an audio content, or a subtitle. The video content and/or the audio content may be of different qualities, and the subtitle may be in various languages. Furthermore, a digital asset may be subject to a license (e.g., a DRM). The license may be unique to the media content or the digital asset.

In some embodiments, the communication medium may be a wired system, such as a coaxial cable system, a fiber optic cable system, an Ethernet cable system, or other similar communication medium. Alternatively, the communication medium may be a wireless network system, such as a wireless personal area network, a wireless local area network, a cellular network, or other similar communication medium.

As shown, a user system 112 may include a smartphone 108 (e.g., iPhone®), a TV 109, a computer 110 (e.g., a personal computer), and/or a tablet 111 (e.g., iPad®), which through their respective network connections 107, can either interact directly or indirectly with the various digital content providers 1-n 102-104, via their respective network connections 106. For example, a network connection 106 or 107 may include wired connections (e.g., Digital Subscriber Line (DSL), optical) and/or wireless connections (e.g., Wi-Fi.) In various embodiments, a network connection 106 or 107 may include an ad hoc network, an intranet, an extranet, a virtual private network (VPN), a local area network (LAN), a wireless LAN (WLAN), a wide area network (WAN), a portion of the Internet, a portion of the Public Switched Telephone Network (PSTN), a cellular telephone network, or any combination thereof. A network connection 106 or 107 needs not necessarily be the same throughout the environment 100. Various user devices 108-111 described herein may be implemented using the example computer system illustrated in FIG. 5.

In one embodiment, a multi-license media content play platform may be hosted by a multi-license media content play system 101 which is coupled to the communication medium 105. The multi-license media content play system 101 may manage the multi-license media content being played among various devices 108-111 of the user system 112. For example, the multi-license media content play system 101 may log various digital assets played by different devices of the user system 112. The multi-license media content play system 101 may further log the digital assets and the corresponding media content provider 102-104. The digital assets may be encrypted when being provided by a media content provider 102-104, and can only be decrypted with a license and/or by a client component of the media content provider 102-104. When a user requests to play a media content including a digital asset that has been previously played at another device, the multi-license media content play system 101 may coordinate the digital asset being played between the previous device and the current device. As such, the user may mix various digital assets provided by different media content providers 102-104 when playing a media content.

In various embodiments, the user system 112 can display any interface related to playing a multi-license media content. For example, the user system 112 may be configured to retrieve a digital asset, to receive a digital asset request from a user, to provide information regarding the digital asset retrieved, to monitor all the digital assets retrieved by the user, to decrypt any encrypted digital asset, to obtain a license (e.g., a DRM), and/or to play various digital assets included in a media content. In one embodiment, a user may download a client component of a multi-license media content play system 101 such as a multi-license media content play application. The client component may be executed locally at a user system 112. In some embodiments, the multi-license media content play system 101 may provide back-end support for the client component. The multi-license media content play system 101 may be responsible for retrieving various digital assets from different providers 102-104, obtaining the license (e.g., a DRM) for a digital asset, associating the license (e.g., a DRM) with the digital asset, decrypting the digital asset with the license (e.g., a DRM), registering various devices 108-111 of a user system 112, providing digital assets with their respective license (e.g., DRMs), and/or providing decrypted digital assets to one or more user devices of the user system 112.

Figure 2:
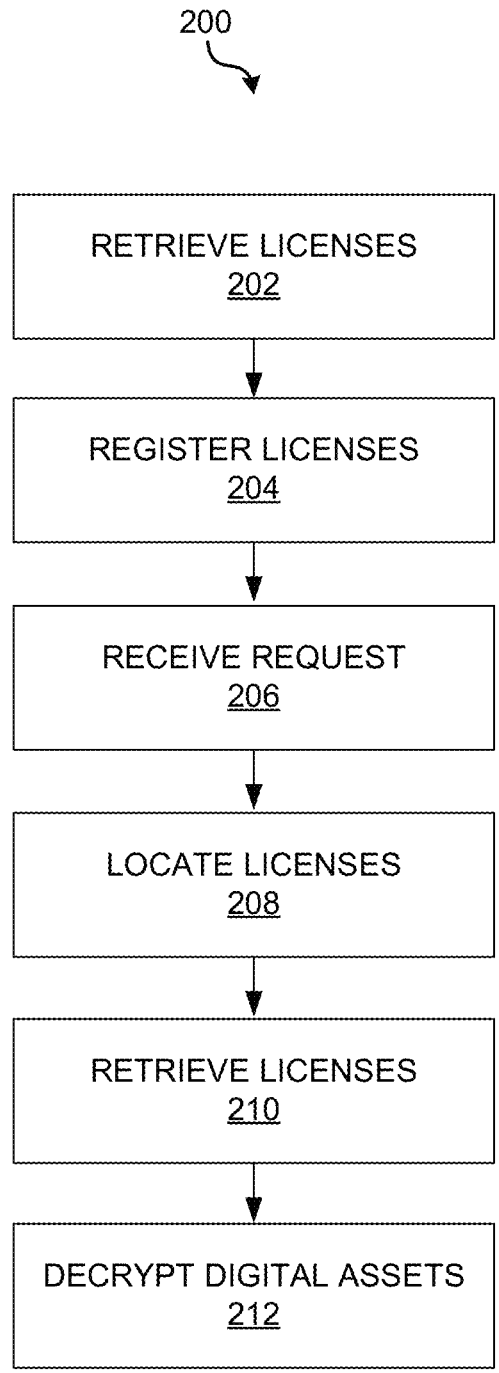
FIG. 2 is a flow diagram illustrating an exemplary method of playing a multi-license media content, such as for the multi-license media content play system in FIG. 1.

FIG. 2 is a flow diagram illustrating an exemplary method 200 of playing a multi-license media content, such as for the multi-license media content play system 101 in FIG. 1. At step 202, one or more licenses such as DRMs are retrieved in response to a user's request for a media content. Digital assets that can be decrypted by the licenses (e.g., the DRM) are also be retrieved. The licenses are necessary for playing the media content when one or more digital assets included in the media content are encrypted. Decryption of an encrypted digital asset may require one or more licenses. The licenses may be downloaded onto the device where the media content is played. The licenses may also be downloaded onto a system, from which the device playing the media content may obtain the licenses when decrypting the digital assets. For example, when a user requests to watch a movie on his or her laptop, digital assets including the video content, the audio content, and the subtitle of the movie need to be decrypted. Licenses (e.g., DRMs) for decrypting each discrete component or digital asset are required in order to play the movie. The licenses (e.g., DRMs) may be downloaded onto the laptop or onto a bridge from which the laptop streams the movie. The license may be unique to the media content provider, and one or more licenses may be required to play a digital asset. In various embodiments, a domain organizes a set of devices owned by the same entity (e.g., a household, a corporation, etc.) and is defined by an access point such as a gateway (e.g., a cable modem, a DSL modem, a wireless router, a network switch, a wireless access point, etc.), or a cloud access (e.g., a user name and password combination).

At step 204, each license retrieved from the media content provider(s) is registered. In various embodiments, an index logging the association of a license and the corresponding location (e.g., a device in the domain) where the license is stored may be created. The license may be uniquely identified by the media content provider and the digital asset which may be decrypted by using the license. The index may include this information identifying the license. In some embodiments, the digital asset corresponding to the license may be retrieved together with the license. The index may log the association of the license, the digital asset, and the corresponding location (e.g., a device in the domain) where they are stored. In one embodiment, the license and/or the digital asset is associated with the media access control (MAC) address of the device where it is stored. In further embodiments, all devices of a domain may be identified, and the index may be distributed among all the devices identified. In one embodiment, the index may be a manifest file.

A request for a media content is received at step 206. Digital asset(s) included in the media content and the appropriate license for decrypting each digital asset may be identified. At step 208, the license(s) identified at step 206, for decrypting the digital assets in order to play the media content are located. Whether the license exists in the domain and the source (e.g., a device or a media content provider) from which the license may be obtained are determined. In one embodiment, the license may be looked up in the index including the association of the license and the source where the license may be obtained. If the license cannot be found in the index, then the license needs to be retrieved from a media content provider. The index may provide information regarding from which content provider this license should be retrieved. However, if the license is found in the index, then the index identifies the source (e.g., the ID of the source, the domain address of the source) from which the license may be retrieved.

At step 210, the license is retrieved. For example, a license, if located in the domain, may be obtained from the source (e.g., a device in the domain) where it is stored. If the license cannot be found in the domain, the license may be retrieved from a media content provider. In some embodiments, the digital assets associated with the licenses may be retrieved together with the license from the source. Subsequently, at step 212, the digital assets are decrypted using the licenses retrieved. A digital asset may require one or more licenses to be decrypted, and a license may be used to decrypt one or more digital assets. A license may also be used to decrypt only a digital asset segment (i.e., a portion of a digital asset). The digital assets included in the media content may originate from different media content providers, and decryption of each digital asset is performed in accordance with the procedure required by the corresponding media content provider. In various embodiments, a license may comprise a time code. The time code may be used to determine the appropriate license for decrypting the digital asset at a time point. For example, this time code may be compared to a reference time point to determine the license required for decrypting a digital asset. In various embodiments, the media content is played such that various components (e.g., the video component, the audio component, the textual component) are played synchronously. Each digital asset may comprise a time code, and all the digital assets included in the media content may be aligned according to a reference time.

Figure 3:
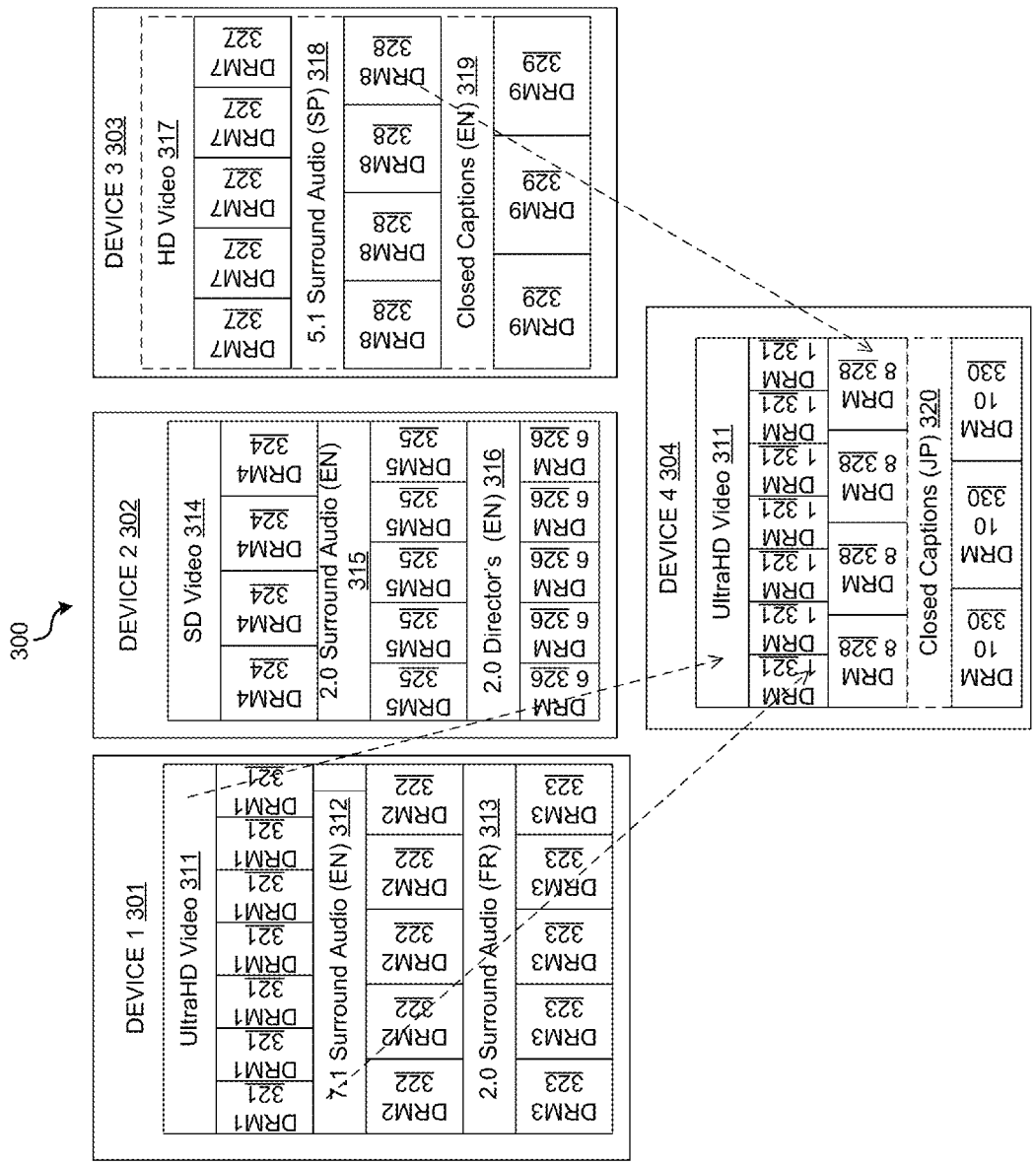
FIG. 3 illustrates an exemplary system of playing a multi-license media content among various devices, such as the user system in FIG. 1.

FIG. 3 illustrates an exemplary system 300 of playing a multi-license media content among various devices 301-304, such as the user system 112 in FIG. 1. The devices 301-304 belong to the same domain. The device 301 may be a smart TV or a setup box where the ultrahigh definition (also called "Ultra HD" or "UHD" or 4K UHD or 8K UHD) version of a media content is played. The Ultra HD version of the media content includes the digital assets such as an Ultra HD video 311, a 7.1 surround sound audio in English 312, and a 2.0 surround sound audio in French 313. The digital assets 311-313 are all encrypted (e.g., DRM'ed) and can only be played with corresponding licenses (e.g., DRMs). In the illustrated example, DRMs 1-3 321-323 are retrieved from the media content provider to decrypt the digital assets 311-313, respectively. The suite of the Ultra HD version of the media content include the digital assets 311-313. The digital assets 311-313 and the DRMs 321-323 are retrieved from one media content provider. The DRMs 321-323 are unique to the media content provider, from which the Ultra HD version of the media content is retrieved. In the illustrated example, the device 301 has copies of the digital assets 311-313 and DRMs 321-323.

The device 302 may be a tablet where a standard version of the media content is played. The standard version of the media content includes a standard video 314, a 2.0 surround sound audio in English 315, and a 2.0 surround sound audio of the director's commentary in English 316. The digital assets 314-316 are all encrypted (e.g., DRM'ed). In the illustrated example, DRMs 4-6 324-326 are retrieved from the media content provider to decrypt the digital assets 314-316, respectively. The suite of the standard version of the media content include the digital assets 324-326, and the corresponding DRMs 324-326 are retrieved from the same media content provider. The DRMs 324-326 are unique to the media content provider, from which the standard version of the media content is retrieved. In the illustrated example, the device 302 has copies of the digital assets 314-316 and DRMs 324-326.

In addition, the device 303 may be a laptop where a full HD version of the media content is played. The full HD version of the media content includes the digital assets such as the HD video 317, a 5.1 surround sound audio in Spanish 318, and a closed caption in English 319. The digital assets 317-319 are all encrypted (e.g., DRM'ed). In the illustrated example, DRMs 7-9 327-329 are retrieved from the media content provider to decrypt the digital assets 317-319, respectively. The suite of the full HD version of the media content include the digital assets 317-319. The DRMs 327-329 are unique to the media content provider, which provides the full HD version of the media content. In the illustrated example, the device 303 has copies of the DRMs 327-329 but does not have copies of the digital assets 317-319.

In various embodiments, an index logging the association of a license (e.g., a DRM) and the source from which the license may be obtained is created. The index may further provide information identifying the media content provider, the media content, and/or the digital asset corresponding to the license. In one embodiment, each device of a domain keeps a copy of the index. Each device may create and update an index upon receiving a DRM and/or a digital asset. When an index is created or updated, the most up-to-date index may be distributed among all devices of the domain. All the devices may update their local copy of the index according to the most up-to-date index received. In another embodiment, a domain coordinator maintains a copy of the index. The domain coordinator may be a device in the domain, or a system (e.g., the multi-license media content play system 101 in FIG. 1) that monitors the media content of a domain. Within the domain, devices other than the domain coordinator do not have to keep a copy of the index. A non-domain coordinator device reports to the domain coordinator that a DRM and/or a digital asset is received, and the domain coordinator may update the index with such information. In the illustrated example, the index comprises information regarding the license source from which the DRMs 1-9 321-329 may be obtained. In addition, the index may comprise the information regarding the media content service provider and/or the digital asset corresponding to each DRM. The index may further comprise the information regarding the source, either within the domain (e.g., a device) or outside the domain (e.g., from a media content provider), from which the digital assets 311-319 may be obtained.

In the illustrated example, the device 304 is another TV where a version of the media content is requested. The requested version includes digital assets such as an Ultra HD video 311, a 5.1 surround sound audio in Spanish 318, and a closed caption in Japanese 320. The DRMs associated with each of the requested digital assets may be looked up in the domain. The device 304 determines that the device 301 has a copy of the DRM 321 associated with the digital asset 311, and the device 303 has a copy of the DRM 328 associated with the digital asset 318. However, none of the devices in the domain has a copy of the DRM 10 330 associated with the digital asset: the closed caption in Japanese 320.

In one embodiment, the device 304 may look up the requested digital asset in its local copy of the index. The device 304 determines that the device 301 has a copy of the Ultra HD video 310, and the device 302 has a copy of the 5.1 surround sound audio in Spanish 314, but the closed caption in Japanese 319 does not exist within the domain. The device 304 retrieves (e.g., downloads or streams) the Ultra HD video 310 from the device 301 and the 5.1 surround sound audio in Spanish from the device 302. The device 304 further retrieves (e.g., downloads or streams) the closed caption in Japanese 319 from a media content provider. The index may be updated to indicate that the closed caption in Japanese 319 may be obtained from the device 304.

The media content is subsequently being played at the device 304. Each of the encrypted digital assets included in the media content is decrypted. The device 304 may decrypt the Ultra HD video 311 by using the DRM 321 according to the procedure required by the media content provider providing the Ultra HD video 311. The decryption may be performed as defined and/or authorized by the media content provider. The definition and/or the authorization may be provided by the client component of the media content provider (e.g., a media content player). The device 304 may stream the 5.1 surround audio in Spanish 318 from the device 303 and decrypt the digital asset 318 by using the DRM 328. The decryption may be performed according to the procedure required by the media content provider providing the 5.1 surround audio in Spanish 318. In addition, the closed caption in Japanese 320 is streamed from a media content provider. This digital asset 320 is further decrypted by using the DRM 330, which is obtained from the media content provider. The decrypted digital assets 311, 318, and 320 are time aligned so that the video component, the audio component, and the closed captions are synchronized when the media content is being played on the device 304.

Referring back to FIG. 2, at step 210, the licenses may be retrieved adaptively. The licenses are retrieved adaptively according to various factors to provide the best available media content delivery to the user. For example, the licenses may be retrieved in consideration of the bit-rate of the corresponding digital asset or digital asset segment, the duration of the corresponding digital asset or digital asset segment, the continuity of the license, the device setting (e.g., the power consumption, the processor, the memory), or the user setting (e.g., the preferred license, the cost).

In various embodiments, a digital asset may be retrieved in segments. For example, when a user requests a high resolution version of a video content (e.g., an Ultra HD video), the high resolution video, which is a digital asset, may be retrieved in segments. Each digital asset segment may be retrieved from a digital asset provider. In some cases such as when the network bandwidth changes, a lower-resolution copy of the video content may be retrieved instead of the high resolution copy to provide an uninterrupted delivery of the media content to the user. As such, a digital asset segment (e.g., the lower-resolution video) that is different from the digital asset segment originally requested (e.g., the high-resolution video) is retrieved. Segments of different digital assets are retrieved such that the media content can be played continuously and without any interruption. Corresponding licenses are also retrieved so that all the digital asset segments can be decrypted.

Figure 4:
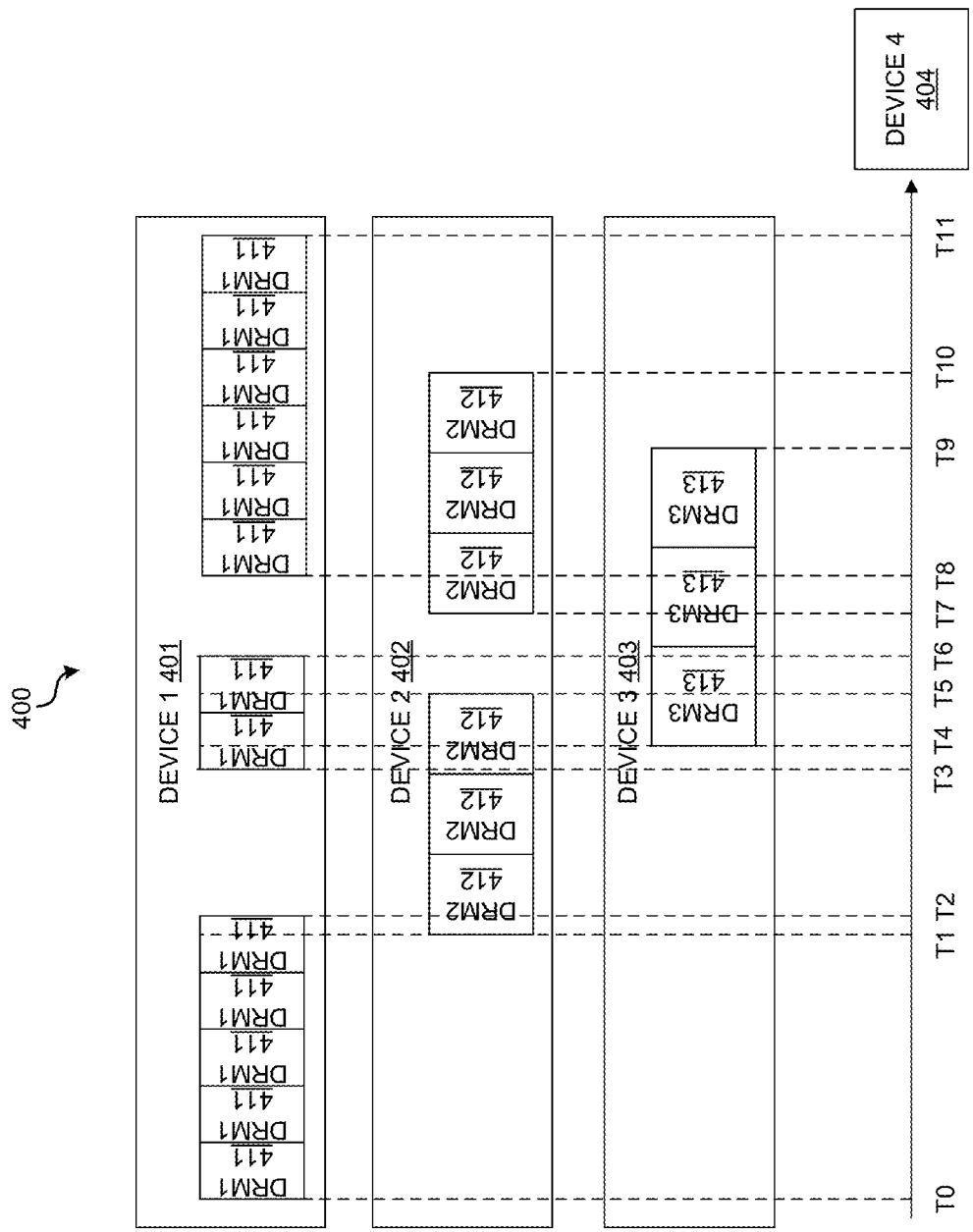
FIG. 4 illustrates an exemplary system of playing a multi-license media content among various devices, such as the user system in FIG. 1.

FIG. 4 illustrates an exemplary system 400 of playing a multi-license media content among various devices 401-404, such as the user system 112 in FIG. 1. The devices 401-404 belong to the same domain. The device 401 may be a smart TV or a setup box where the Ultra HD video of a movie is played. Licenses such as DRMs 411 are retrieved onto the device 401 for decrypting the Ultra HD video. The device 402 may be a laptop where the HD video of the movie is played. Licenses such as DRMs 412 are retrieved onto the device 402 for decrypting the HD video. The device 403 may be a tablet where the standard video of the movie is played. Licenses such as DRMs 413 are retrieved onto the device 403 for decrypting the standard video.

An index logging the association of each license and the corresponding source may be created and shared among all devices 401-404 of the domain. In the illustrated example, the index provides information that the device 401 has copies of the DRM 411 which can be used to decrypt the Ultra HD video, the device 402 has copies of the DRM 412 which can be used to decrypt the HD video, and the device 403 has copies of the DRM 413 which can be used to decrypt the standard video. The Ultra HD video, the HD video, and the standard video can be provided by the same or different media content providers.

The index may further describe each license (e.g., the continuity, the time code, etc.). A device may not retrieve a complete license or all of the license units for an entire digital asset, rather, the device may retrieve portions of a complete license or some of the license units for the entire digital asset. A license segment may refer to a portion of a complete license or successive license units. The index may provide descriptions such as the time duration of a license segment and/or the number of license units included in a license segment. For example, the index may provide that the DRM segments 411 for the Ultra HD video of the time period $T_0$ to $T_2$, $T_3$ to $T_6$, and $T_8$ to $T_{11}$ can be retrieved from the device 401; the DRM segments 412 for the HD video of the time period $T_1$ to $T_5$ and $T_7$ to $T_{10}$ can be retrieved from the device 402; and DRM segments 413 for the standard video of the time period $T_4$ to $T_9$ can be retrieved from the device 403. The index may provide that there are five (5) DRM segments 411 for the time period $T_0$ to $T_2$, two (2) DRM segments 411 for the time period $T_3$ to $T_6$, and six (6) DRM segments 411 for the time period $T_8$ to $T_{11}$; there are three (3) DRM segments 412 for the time period $T_1$ to $T_5$ and three (3) DRM segments 412 for the time period $T_7$ to $T_{10}$; and there are three (3) DRM segments 413 for the time period $T_4$ to $T_9$. The index may further describe the digital asset or the digital asset segment that can be decrypted by each license segment, such as the bit-rate, the highest-bit rate, the duration, etc.

The device 404 is another TV where the video component of the media content is requested. Licenses (e.g., DRMs) or license segments related to the video component of the media content may be looked up in the domain. In one embodiment, the device 404 may look up the licenses or the license segments in its local copy of the index. The device 404 determines that the device 401 has copies of the DRM segments 411 corresponding to the Ultra HD video, the device 402 has copies of the DRM segments 412 corresponding to the HD video, and the device 403 has copies of the DMR segments 413 corresponding to the standard video.

Licenses or license segments corresponding to the requested digital asset are determined to be retrieved in order to play the digital asset. Nevertheless, when the digital asset which can be decrypted by using the licenses or the license segments is incomplete, additional licenses or license segments need to be located and retrieved such that the complete digital asset may be played. A license or a license segment that corresponds to a related digital asset to the requested digital asset may be retrieved. The related digital asset and the requested digital asset correspond to the same component of the requested media content, but may have different characteristics (e.g., the quality, the resolution, the bit-rate, the highest-bit rate, the time duration, etc.) In the illustrated example, the device 401 only has copies of the DRM segments 411 for the time periods of $T_0$ to $T_2$, $T_3$ to $T_6$, and $T_8$ to $T_{11}$, and the DRM segments for the times periods of $T_2$ to $T_3$ and $T_6$ to $T_8$ are missing. As a result, the Ultra HD video for the time periods of $T_2$ to $T_3$ and $T_6$ to $T_8$ cannot be decrypted and played.

Multiple related digital assets may correspond to a requested digital asset. Various factors may affect the determination regarding which related digital asset(s) should be played and which license or license segments should be retrieved. Exemplary factors include the bit-rate or the highest bit-rate of the related digital asset, the highest bit-rate of the related digital asset, the time duration of the license segment, the number of license units of a license segment, the cost to obtain the license segment, the power consumption related to the use of the license segment, the device setting (e.g., the processor, the memory, any restriction on rights, etc.), and/or the user setting (e.g., the preferred media content provider, the cost preference, the power preference, etc.).

In the illustrated example, the DRM segments 411 are retrieved for the time period $T_0$ to $T_1$, the DRM segments 412 are retrieved for the time period $T_1$ to $T_4$, the DRM segments 413 are retrieved for the time period $T_4$ to $T_7$, the DRM segments 412 are retrieved for the time period $T_7$ to $T_8$, and the DRM segments 411 are retrieved for the time period $T_8$ to $T_{11}$. For the time period $T_0$ to $T_1$, the DRM segments 411 are the only license segments that are available. For the time period $T_1$ to $T_4$, the DRM segments 412 are retrieved because the DRM segments 411 are missing for the time period $T_2$ to $T_3$. For the time period $T_1$ to $T_2$, the DRM segment 412 rather than the DRM segment 411 is retrieved because the user has selected to download the more complete DRM segments. For the time period $T_4$ to $T_7$, the DRM segments 413 are downloaded because the DRM segments 411 are missing for the time period of $T_6$ to $T_8$, the DRM segments 412 are missing for the time period of $T_5$ to $T_7$, and the user's selection of downloading the DRM segments that are more complete. The DRM segments 411 are retrieved for the time period of $T_8$ to $T_{11}$ because the user has requested the Ultra HD video.

The device 404 or the network controller of the domain may determine to retrieve the DRM segments 411 from the device 401 to decrypt the Ultra HD video, to retrieve the DRM segments 412 from the device 402 to decrypt the HD video, and to retrieve the DRM segments 413 from the device 403 to decrypt the standard video.

Figure 5:
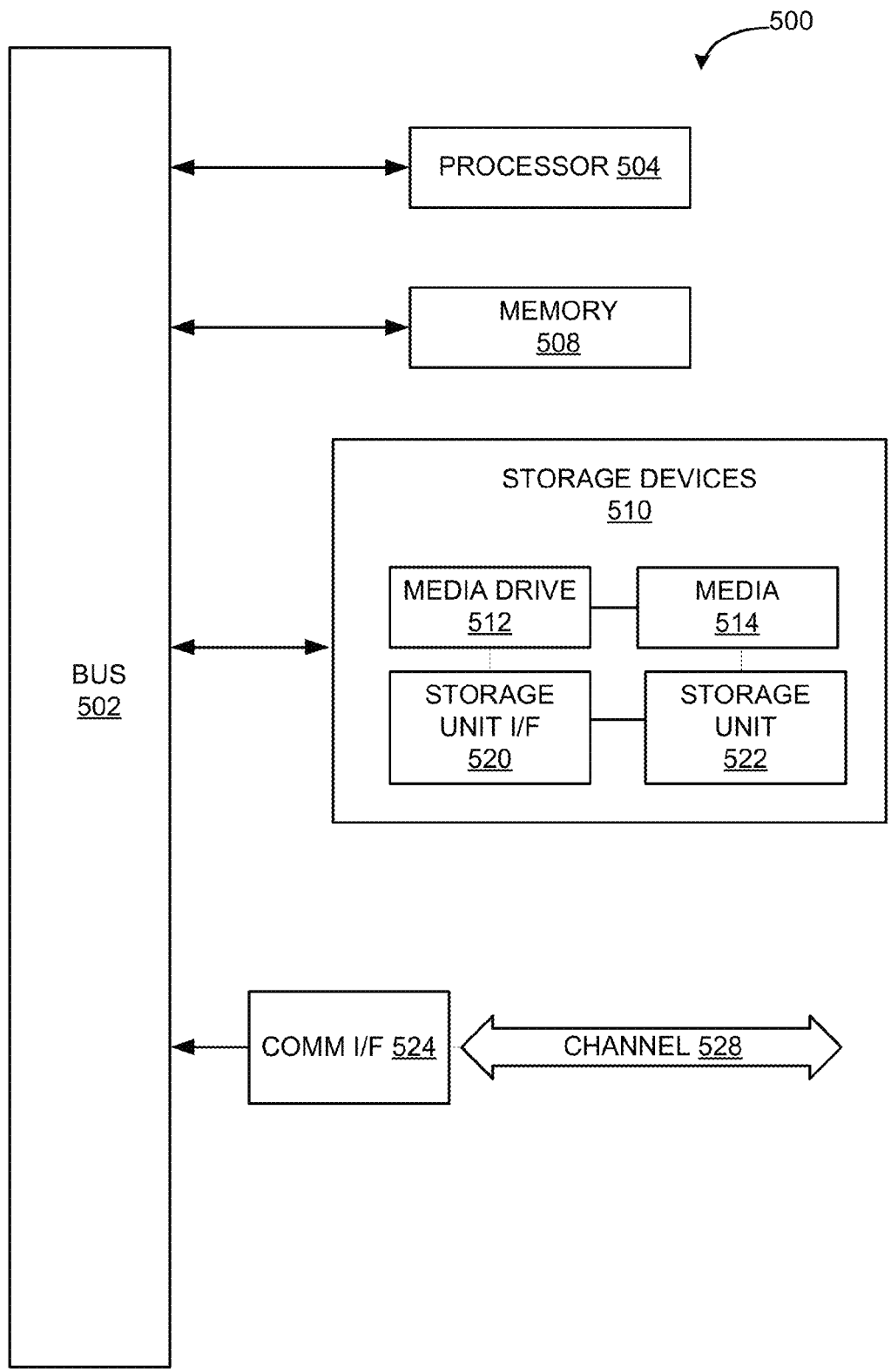
FIG. 5 illustrates an example computing module that may be used in implementing various features of embodiments of the application.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 5. Various embodiments are described in terms of this example-computing module 500. After reading this description, it will become apparent to a person skilled in the relevant art how to implement the application using other computing modules or architectures.

Referring now to FIG. 5, computing module 500 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 508, storage unit 520, storage media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method of playing media contents, comprising:
    receiving a request for a media content comprising a first digital asset and a second digital asset on a first device;
    locating and retrieving a first-plurality of licenses and a second plurality of licenses, the first plurality of licenses corresponding to the first digital asset and the second-plurality of licenses corresponding to the second digital asset;
    decrypting the first digital asset using the first plurality of licenses and the second digital asset using the second plurality of licenses, wherein each of the first plurality of licenses decrypts a corresponding segment of the first digital asset, and wherein each of the second plurality of licenses decrypts a corresponding segment of the second digital asset; and
    playing the first digital asset and the second digital asset in synchronization with each other on the first device;
    wherein the first plurality of licenses is different from the second plurality of licenses;
    wherein each license of the first plurality and the second plurality of licenses comprises a time code that is used to decrypt a corresponding segment of the first digital asset or the second digital asset; and
    the step of playing the first digital asset and the second digital asset comprises using each of the time codes of the first plurality of licenses to determine an appropriate license for decrypting a corresponding segment of the first digital asset and using each of the time codes of the second plurality licenses to determine an appropriate license for decrypting a corresponding segment of the second digital asset.

2. The computer-implemented method of claim 1, wherein a first license of the first plurality of licenses is retrieved from a set of devices of a domain, further comprising: retrieving a third plurality of licenses on a second device of the set of devices; associating each license of the third plurality of licenses with the second device, wherein the set of devices comprises the first device.

3. The computer-implemented method of claim 2, wherein the first device is different from the second device.

4. The computer-implemented method of claim 2, wherein the step of locating and retrieving the first plurality of licenses comprises: determining whether the first plurality of licenses comprises the first license; and retrieving the first license from the second device.

5. The computer-implemented method of claim 2, wherein the step of associating each license of the third plurality of licenses with a second device comprises associating each license with a media access control (MAC) address of the second device.

6. The computer-implemented method of claim 2, further comprising creating an index storing the association of the second device and the third plurality of licenses.

7. The computer-implemented method of claim 6, further comprising distributing the index to all devices in the domain.

8. The computer-implemented method of claim 1, wherein the media content comprises a third digital asset, and the step of playing the first digital asset and the second digital asset comprises detecting a request for the third digital asset, locating and detecting the third digital asset, and playing the third digital asset in synchronization with the first and the second digital assets.

9. A system of playing media contents, comprising:
a first device having memory and a processor coupled to the memory, the memory storing a set of instructions configured to cause the processor to:
receive a request for a media content comprising a first digital asset and a second digital asset;
locate and retrieve a first plurality of licenses and a second plurality of licenses, the first plurality of licenses corresponding to the first digital asset and the second plurality of licenses corresponding to the second digital asset;
decrypt the first digital asset using the first plurality of licenses and the second digital asset using the second plurality of licenses, wherein each of the first plurality of licenses decrypts a corresponding segment of the first digital asset, and wherein each of the second plurality of licenses decrypts a corresponding segment of the second digital asset; and
play the first digital asset and the second digital asset in synchronization with each other on the first device;
wherein the first plurality of licenses is different from the second plurality of licenses;
wherein each license of the first plurality and the second plurality of licenses comprises a time code that is used to decrypt a corresponding segment of the first digital asset or the second digital asset; and
the first set of instructions is configured to cause the processor to use each of the time codes of the first plurality of licenses to determine an appropriate license for decrypting a corresponding segment of the first digital asset and use each of the time codes of the second plurality licenses to determine an appropriate license for decrypting a corresponding segment of the second digital asset.

10. The system of claim 9, further comprising a second device having second memory and a second processor coupled to the second memory, the second memory storing a second set of instructions configured to cause the second processor to: retrieve a third plurality of licenses; associate each license of the third plurality of licenses with the second device, wherein first license of the first plurality of licenses is retrieved from a set of devices of a domain and the set of devices comprises the first device.

11. The system of claim 10, wherein the first device is different from the second device.

12. The system of claim 10, wherein the first set of instructions is configured to cause the first processor to determine whether the first plurality of licenses comprises the first license; and retrieve the first license from the second device.

13. The system of claim 10, wherein the second set of instructions is configured to cause the second processor to associate each license with a media access control (MAC) address of the second device.

14. The system of claim 10, wherein the second set of instructions is further configured to cause the second processor to create an index storing the association of the second device and the third plurality of licenses.

15. The system of claim 14, wherein the second set of instructions is further configured to cause the second processor to distribute the index to all devices in the domain.

16. The system of claim 9, wherein the media content comprises a third digital asset, and wherein the first set of instructions is configured to cause the first processor to detect a request for the third digital asset, locate and detect the third digital asset, and play the third digital asset in synchronization with the first and the second digital assets.

17. A computer-implemented method of playing media contents, comprising:
receiving a request for a media content comprising a first digital asset segment and a second digital asset segment on a device;
locating and retrieving a first plurality of license segments and a second plurality of license segments, the first plurality of license segments corresponding to a third digital asset segment and the second plurality of license segments corresponding to the second digital asset segment;
determining a third plurality of license segments required for playing the first digital asset segment when incomplete;
decrypting the third digital asset segment using the first plurality of license segments and the second digital asset segment using the second plurality of license segments; and
playing the third digital asset segment and the second digital asset segment in synchronization with each other on the device;
wherein the first plurality of license segments is different from the second plurality of license segments, and the third digital asset segment is related to the first digital asset segment such that the third digital asset segment and the first digital asset segment correspond to the same component of the requested media content;
wherein each license of the first plurality of license segments and the second plurality of licenses segments comprises a time code that is used to decrypt a corresponding segment of the first digital asset segment or the second digital asset segment; and each of the time codes of the first plurality of license segment determines an appropriate license for decrypting a corresponding segment of the first digital asset segment and each of the time codes of the second plurality license segment determines an appropriate license for decrypting a corresponding segment of the second digital asset segment.

* * * * *